United States Patent
Yost et al.

(10) Patent No.: US 8,537,236 B2
(45) Date of Patent: Sep. 17, 2013

(54) AUTOMATIC ADJUSTMENT OF CAPTURE PARAMETERS BASED ON REFERENCE DATA

(75) Inventors: Jason Yost, Windsor, CO (US); Shane D. Voss, Fort Collins, CO (US); Robert P. Cazier, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 266 days.

(21) Appl. No.: 12/900,291

(22) Filed: Oct. 7, 2010

(65) Prior Publication Data
US 2012/0086825 A1    Apr. 12, 2012

(51) Int. Cl.
*H04N 5/228* (2006.01)

(52) U.S. Cl.
USPC .................................. 348/222.1; 348/211.99

(58) Field of Classification Search
None
See application file for complete search history.

(56) References Cited

U.S. PATENT DOCUMENTS

| | | | | |
|---|---|---|---|---|
| 5,625,765 A | * | 4/1997 | Ellenby et al. | 345/633 |
| 6,064,398 A | * | 5/2000 | Ellenby et al. | 345/633 |
| 6,970,189 B1 | * | 11/2005 | Bernstein et al. | 348/211.2 |
| 2002/0093435 A1 | * | 7/2002 | Baron | 340/995 |
| 2005/0122405 A1 | * | 6/2005 | Voss et al. | 348/211.2 |
| 2005/0136974 A1 | * | 6/2005 | Ho et al. | 455/556.1 |
| 2005/0237394 A1 | * | 10/2005 | Katiblan et al. | 348/226.1 |
| 2007/0023497 A1 | * | 2/2007 | Chuang et al. | 235/375 |
| 2007/0183767 A1 | * | 8/2007 | Kasai et al. | 396/56 |
| 2007/0236564 A1 | * | 10/2007 | Takita | 348/81 |
| 2008/0239095 A1 | * | 10/2008 | Lee et al. | 348/226.1 |
| 2009/0051785 A1 | * | 2/2009 | Kamada et al. | 348/231.5 |
| 2009/0079846 A1 | * | 3/2009 | Chou | 348/223.1 |
| 2009/0162042 A1 | * | 6/2009 | Wexler et al. | 396/49 |
| 2011/0050909 A1 | * | 3/2011 | Ellenby et al. | 348/207.1 |
| 2011/0058802 A1 | * | 3/2011 | Forutanpour et al. | 396/225 |
| 2011/0267492 A1 | * | 11/2011 | Prentice et al. | 348/223.1 |

OTHER PUBLICATIONS

Ricoh Technical Report No. 35. Dec. 2009. Shade Segmentation for New Automatic White Balance.

* cited by examiner

*Primary Examiner* — Nelson D. Hernández Hernández
*Assistant Examiner* — Dennis Hogue

(57) ABSTRACT

Reference data associated with an image capture device is collected while the image capture device is directed toward a scene area. A capture control on the image capture device is automatically adjusted based at least in part on the reference data.

9 Claims, 4 Drawing Sheets

AUTOMATIC ADJUSTMENT OF CAPTURE PARAMETERS BASED ON REFERENCE DATA

BACKGROUND

Many cameras, including digital cameras, include an automatic mode that places much of the decision-making responsibility regarding various camera settings on the camera as opposed to the user (photographer). Thus, a camera in automatic mode frequently determines and controls the various aspects of exposure, including light metering, white balance, aperture, focusing, sensitivity, etc. Ultimately, a camera in automatic mode "guesses" as to the type of shot desired by the user based on limited input information (e.g., light metering). However, the accuracy of the camera's guess-work is limited by the information available to the camera.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

Many image capture devices (e.g., a digital camera) include a built in light meter, which measures the amount of light in the scene at various places. When the device is in automatic mode, it may access an exposure table that determines the appropriate shutter speed and aperture for the given light conditions. Some image capture devices also take into account the focal length of the camera lens and attempt to use higher shutter speeds if needed to reduce the effects of device movement.

In addition to automatic mode, situation-specific modes might be employed on an image capture device. These modes, when selected by a user, are designed to employ capture controls specific to a particular scene condition. In an example, an image capture device might have a user-selectable snow mode that adjusts exposure settings to account for bright light in a scene that is reflecting off of snow. Other common situation-specific modes include portrait mode, sports mode, and night mode. As used herein, a capture control or capture parameter refers to a setting that affects one or more exposure characteristics of the image capture device when capturing an image. Examples of capture controls include, but are not limited to, white balance, aperture size, shutter speed, focus position, ISO (light sensitivity), etc.

Various embodiments described herein facilitate automatically adjusting a capture control on image capture devices (such as digital cameras, smartphones, cell phones, video cameras, etc.) based on reference data associated with the scene the image capture device is attempting to capture. In other words, rather than requiring a user to select a scene-specific camera mode (e.g., snow mode), the image capture device collects reference data (e.g., location data, device orientation data, etc.) that is used to determine scene-specific conditions and adjust one or more capture controls accordingly.

Figure 1:
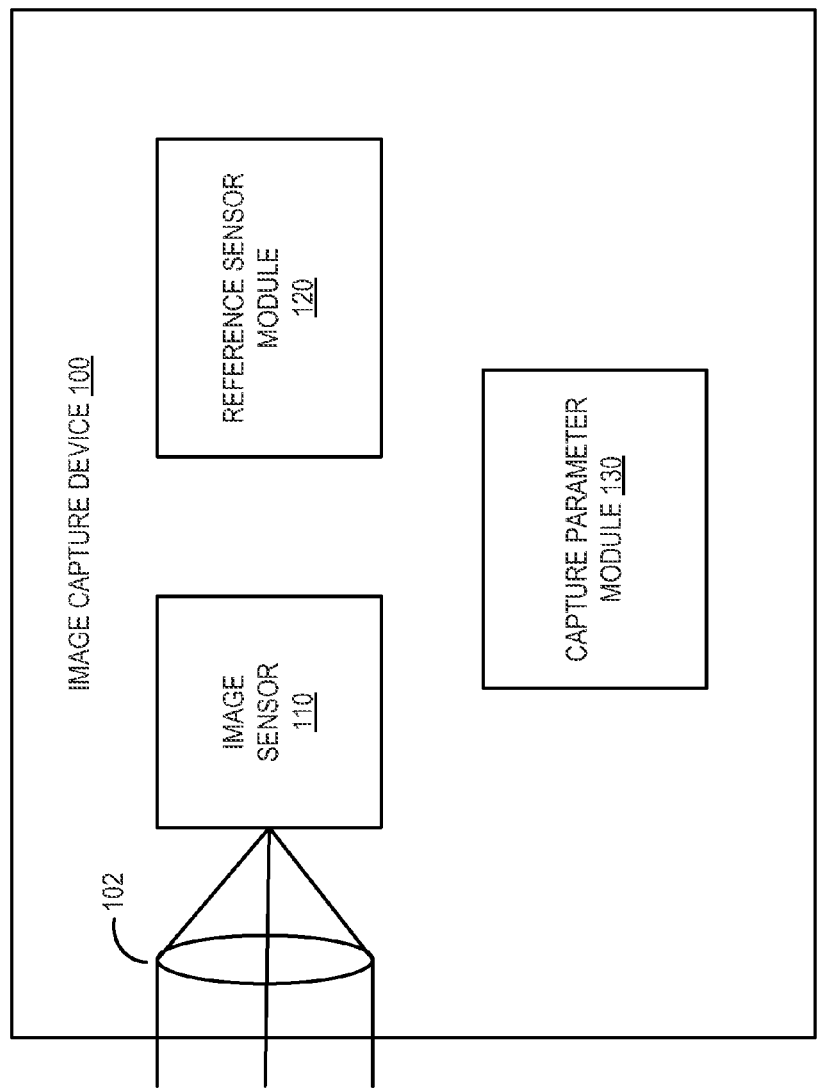
FIG. 1 is a block diagram illustrating an image capture device according to various embodiments.

FIG. 1 is a block diagram illustrating a system according to various embodiments. FIG. 1 includes particular components, modules, etc. according to various embodiments. However, in different embodiments, other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

Image capture device 100 may be a digital camera, a cell phone camera, smartphone camera, a video camera or any other device capable of converting optical images to digital images. Optical system 102 produces optical images that are captured and converted to digital images by image sensor 110. Reference sensor module 120 acquires reference information (in connection with an image capture). Reference sensor module 120 may be an orientation sensor (e.g., accelerometer, gyroscope, etc.), a magnetometer, a location sensor (e.g., GPS), or other sensor capable of providing information that describes the position, location and/or orientation of image capture device 100 with respect to one or more reference axes. In certain embodiments, reference sensor module 120 may be a combination of various reference sensors such as, but not limited to, those described above.

Capture parameter module 130 automatically adjusts a capture parameter on image capture device 100 based on reference information collected by reference sensor module 120. In an example, reference sensor module 120 includes a GPS (global positioning system) sensor that detects image capture device 100 as being located on a beach in Maui, Hawaii. Also in this example, reference sensor module 120 includes a directional sensor (e.g., a magnetometer) that detects image capture device 100 as pointing west. Combining the location and directional information with timing information (e.g., from the GPS sensor or an internal device clock) might result in capture parameter module 130 determining that the user of image capture device 100 intends to take a picture of a sunset. Accordingly, capture parameter module 130 automatically adjusts one or more capture parameters to optimize image capture for a sunset scene. In devices that have a user-selectable (or manual) sunset mode, capture parameter module 130 might automatically switch to sunset mode in response to determining that the user intends to take a picture of a sunset.

Figure 2:
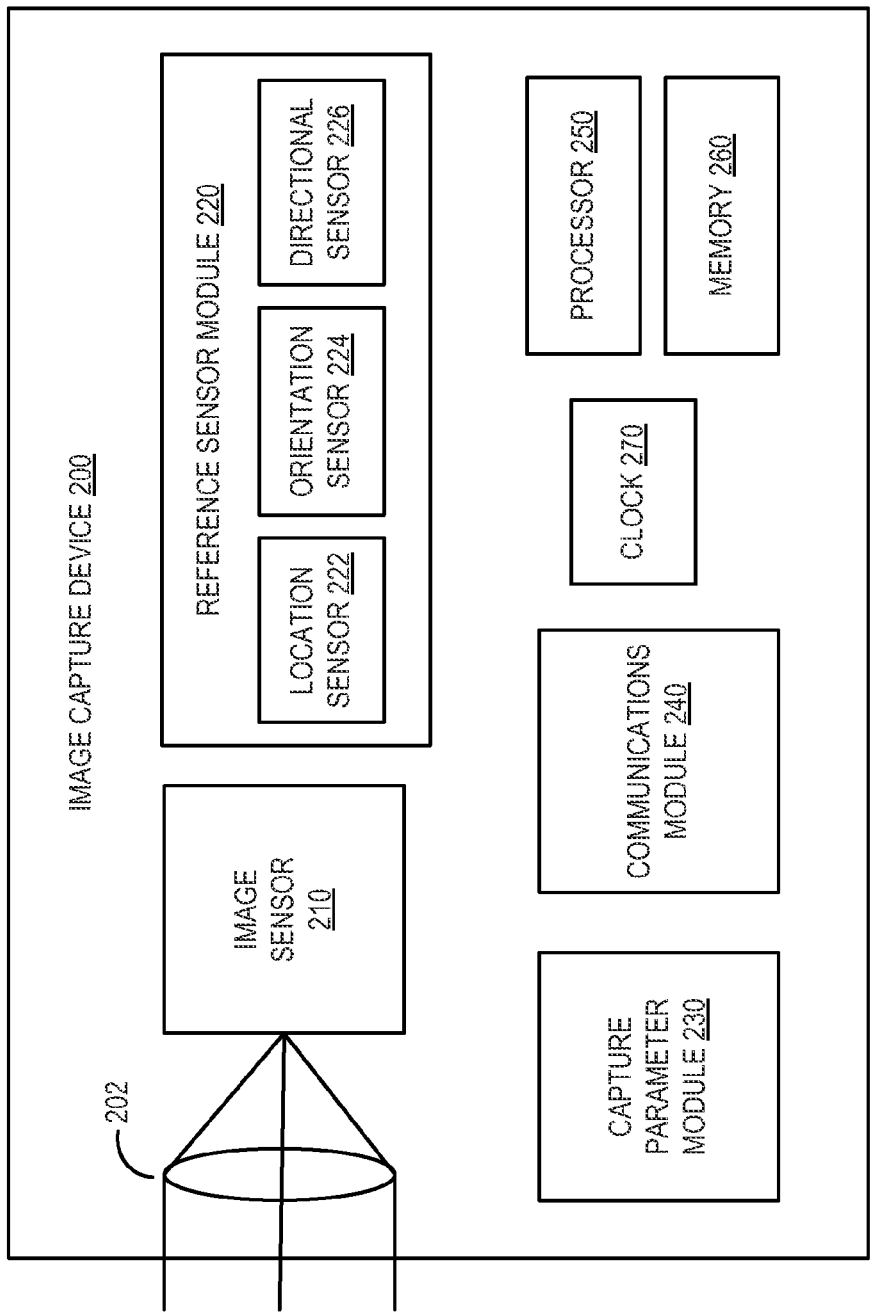
FIG. 2 is a block diagram illustrating an image capture device according to various embodiments.

FIG. 2 is a block diagram of a system according to various embodiments. FIG. 2 includes particular components, modules, etc. according to various embodiments. However, in different embodiments, other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

Image capture device 200 may be a digital camera, a cell phone camera, smartphone camera, a video camera or any other device capable of converting optical images to digital images. Optical system 202 produces optical images that are captured and converted to digital images by image sensor 210.

Reference sensor module 220 acquires reference data in connection with an image capture by image sensor 210. Reference sensor module 220 includes location sensor 222 (e.g., GPS sensor), orientation sensor 224 (e.g., accelerometer, gyroscope, etc.), and directional sensor 226 (e.g., a magnetometer). Other sensors and/or components capable of providing information that describes the position, location and/or orientation of image capture device 200 may also be used. For example, where image capture device 200 is a cell phone or smartphone, cell tower triangulation might be used to determine the location of device 200.

Communications module 240 requests additional information about a potential image scene targeted by device 200 (and/or the scene surroundings) based on reference data from reference module 220. Communications module 240 can be any type of module capable of communication with an external network. For example, communications module 240 could be a LAN (local area network) module, such as an Ethernet module. In various embodiments, communications module 240 is a wireless communications module. Examples of wireless communications modules include WLAN (wireless local area network) modules, cellular radio modules (e.g., 2G, 3G, WiMax, Ultra Mobile Broadband, 3GPP Long Term Evolution, 4G, etc.) and the like.

In an example, communications module 240 sends location coordinates (e.g., obtained by location sensor module 222) for image capture device 200 to the cloud or to a particular network server. As used herein, the term "cloud" refers generally to Internet-based computing, whereby shared resources, software and/or information are provided to Internet-connected devices on demand. In response to sending location coordinates, communications module 240 receives environs data specific to the location of device 200. The environs data may include weather-related information (e.g., whether it is sunny, snowy, overcast, etc.) about the location. Environs data might include other information such as smog index information.

In some embodiments, the environs data includes information about the physical environment within the vicinity of device 200 and, in particular, the physical environment of the scene area to be captured. For example, the environs data could be a model of the surrounding area that includes the scene area. The model might be three-dimensional, two-dimensional (e.g., a map, topographical map, satellite imagery, etc.), or descriptive (e.g., text, symbols, metadata, etc.). For example, an environs model might indicate that the scene area is in a grove of shaded trees or it might indicate whether device 200 is inside a building or outdoors. Combining information from the model with real-time directional and orientation data, device 200 is made "aware" of the scene area as optical system 202 is pointed in different directions and/or at different objects. While an environs model can be general, perhaps only distinguishing between indoors and outdoors, any level of detail could be used in the various models contemplated herein. For example, a 3-D model might include a level of detail similar to that seen by the human eye (e.g., virtual reality). Thus, a model might include details about windows, light fixtures and/or other objects and features inside a house, or it might include details about specific trees (e.g., location, height, shape, angle of protrusion from the ground, etc.), snow conditions, and/or other outdoor objects or conditions.

In an example, a video camera pans across a room in a house. The camera, based on the environs data described above (e.g., a 3-D model and current weather information) can anticipate changes in ambient light as the camera pans, for example, from a dark wall to a large window on a sunny day.

Capture parameter module 230 automatically adjusts a capture parameter on image capture device 200 based on reference information collected by reference sensor module 220, environs data received via communications module 240, and/or other data managed on device 200. In an example, location sensor 222 detects image capture device 200 as being located on a beach in Maui, HI. In addition, directional sensor 226 (e.g., a magnetometer) detects image capture device 200 as pointing west. Weather information acquired by communications module 240 may further indicate that the sky is currently clear in Maui. Additionally, the time and date indicated by clock 270 could be used to access a table in memory 260 to determine whether the current time and date coincides with a timeframe during which a sunset would occur if conditions are right. The combination of location, direction, weather, and time information increases the accuracy of the determination that device 200 is targeting a sunset scene. Based on this determination, capture parameter module 230 automatically adjusts one or more capture parameters to optimize image capture for a sunset scene. In embodiments where device 200 includes a user-selectable sunset mode, capture parameter module 230 automatically switches to sunset mode when it is determined that device 200 is targeting a scene that includes a sunset.

In some embodiments, the particular combination of reference data, timing information, and/or environs data may be compared against a lookup table that flags specific combinations of data to determine particular capture parameter adjustments. In other embodiments, capture parameter module 230 may further include a decision module that performs statistical analysis on the reference data, timing information, and/or environs data to determine particular capture parameter adjustments. In yet other embodiments, the reference data, timing information, and/or environs data may be sent by communications module 240 to the cloud or a to network server to determine which capture parameters to adjust, if any.

The example described above may be referred to as an automatic sunset mode, which is in contrast to a user-selectable (or manual) sunset mode. Again, based on various combinations of reference data, timing information, and environs data (e.g., weather, environment models, etc.), an image capture device automatically adjusts one or more capture parameters to achieve the automatic sunset mode. Automatic sunset mode is just one example of the many automatic modes that can be generated based on various combinations of reference data, timing information, and/or environs data. Other automatic modes that can be achieved according to embodiments described herein include, but are not limited to, snow mode, beach mode, fireworks (e.g., at night in the sky) mode, starlight mode, Christmas light mode, waterfall mode, foliage mode, landscape mode, etc. In addition to these situational modes, reference data and/or environs data can be used to automatically adjust white balance, ISO, focus optimization, and/or other capture parameters on an individual basis.

Various modules and/or components illustrated and described in FIG. 2 may be implemented as a computerreadable storage medium containing instructions executed by a processor (e.g., processor 250) and stored in a memory (e.g., storage 260).

Figure 3:
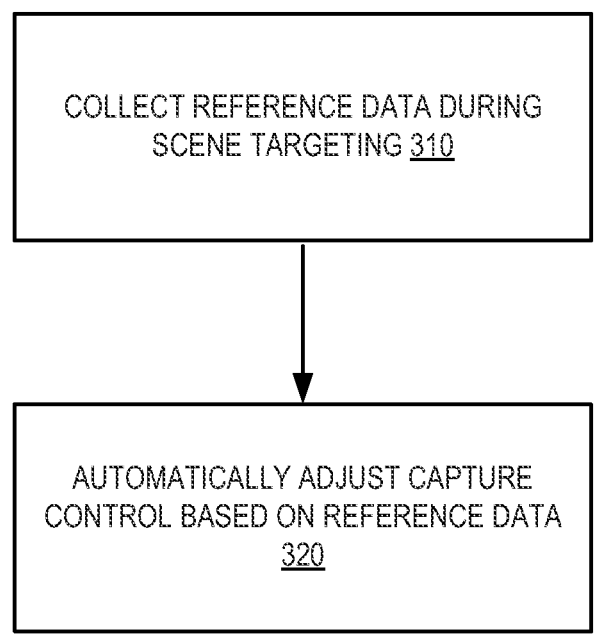
FIG. 3 is a flow diagram of operation in a system according to various embodiments.

FIG. 3 is a flow diagram of operation in a system according to various embodiments. FIG. 3 includes particular operations and execution order according to certain embodiments. However, in different embodiments, other operations, omitting one or more of the depicted operations, and/or proceeding in other orders of execution may also be used according to teachings described herein.

An image capture device collects 310 reference data as the device targets or sights a potential scene area. Reference data may include location, device orientation, device direction, etc. For example, to collect location data, the device may include a GPS module or the device may use triangulation. Based on the reference data, the image capture device automatically adjusts 320 a capture control on the image capture device. For example, if the device determines its location to be in Antarctica (where it might be assumed that most everything is always covered in snow), the device might automatically adjust one or more capture controls to compensate for the lighting effects of snow. Or, if the device has a manual snow mode, the device might automatically switch itself into snow mode.

Figure 4:
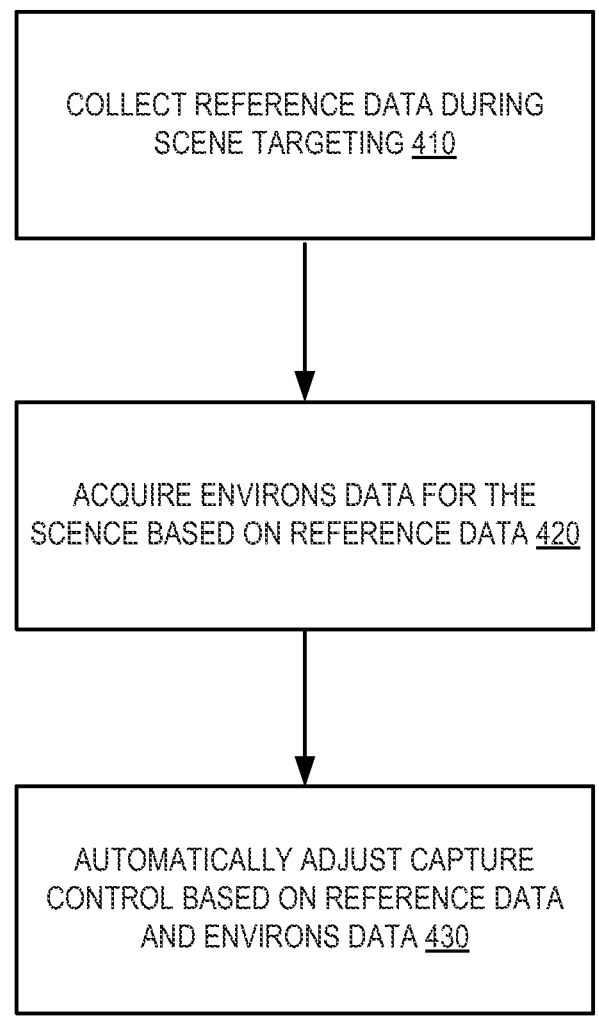
FIG. 4 is a flow diagram of operation in a system according to various embodiments.

FIG. 4 is a flow diagram of operation in a system according to various embodiments. FIG. 4 includes particular operations and execution order according to certain embodiments. However, in different embodiments, other operations, omitting one or more of the depicted operations, and/or proceeding in other orders of execution may also be used according to teachings described herein.

An image capture device collects 410 reference data as the device targets or sights a scene area. Reference data may include location, device orientation, device direction, etc. For example, to collect location data, the device may include a GPS module or the device may use triangulation. In addition, the image capture device acquires 420 environs data based on the reference data. For example, the device might retrieve a map, three-dimensional (e.g., virtual reality) model or other environs data from the cloud or a particular network server based on its location. In certain embodiments, the image capture device might maintain environs data locally, in which case the location or other reference data could be used in a table lookup to access the local environs data on the device.

Based on the reference data and the environs data, the image capture device automatically adjusts 430 a capture control on the image capture device. For example, the device might retrieve a 3-D model for a specific location that indicates, for example, whether the device is indoors or outdoors, whether it is facing a window or a waterfall, or whether it is sunny or snowing outside. Some or all of this information may be used to automatically determine a situation-specific camera mode or set of capture controls suited to the targeted scene and/or surroundings.

Various modifications may be made to the disclosed embodiments and implementations of the invention without departing from their scope. Therefore, the illustrations and examples herein should be construed in an illustrative, and not a restrictive sense.

The invention claimed is:

1. A method, comprising:
  collecting reference data associated with an image capture device as the image capture device is targeting a scene area;
  acquiring environs data for the scene area based on the reference data using a three-dimensional model of a surrounding area that includes the scene area; and
  automatically adjusting a capture control on the image capture device based at least in part on the reference data and the environs data by performing statistical analysis on the reference data and the environs data to determine adjustments to the capture control.

2. The method of claim 1, wherein the reference data associated with the image capture device is selected from the group consisting of location data, orientation data, and directional data.

3. The method of claim 1, wherein automatically adjusting the capture control comprises:
  determining that the scene area includes a weather phenomenon based at least in part on the reference data; and
  automatically adjusting the capture control on the image capture device to account for the weather phenomenon.

4. The method of claim 1, wherein automatically adjusting the capture control comprises:
  determining that the scene area includes a night sky event based at least in part on the reference data; and
  automatically adjusting the capture control on the image capture device to account for the night sky event.

5. An image capture device, comprising:
  a reference sensor module to collect reference information about the image capture device while the image capture device is engaged with a scene area and to acquire environs data for the scene area based on the reference information using a three-dimensional model of a surrounding area that includes the scene area; and
  a capture parameter module to automatically adjust a capture parameter on the image capture device based at least in part on the reference information and the environs data;
  wherein the capture parameter module comprises a decision module to perform statistical analysis on the reference information and the environs data to determine adjustments to the capture parameter.

6. The image capture device of claim 5, wherein the reference sensor module further comprises one or more sensors selected from the group consisting of:
  a location sensor;
  an orientation sensor; and
  a directional sensor.

7. The image capture device of claim 5, further comprising:
  a communications module to request weather information corresponding to the reference information; and
  the capture parameter module further to automatically adjust a capture parameter based at least in part on the weather information in view of the reference information.

8. The image capture device of claim 7, further comprising:
  a processor to receive reference information from the reference sensor module and weather information from the communications module to determine that the scene area includes a sunset; and
  the capture parameter module further to automatically adjust a capture parameter on the image capture device to account for the sunset.

9. The image capture device of claim 5, further comprising:
  a processor to receive reference information from the reference sensor module and timing information from an internal clock to determine that the scene area includes a night sky; and
  the capture parameter module further to automatically adjust a capture parameter on the image capture device to account for the night sky.

* * * * *